(12) United States Patent
Hall et al.

(10) Patent No.: US 10,604,192 B2
(45) Date of Patent: Mar. 31, 2020

(54) METHOD OF CONSTRUCTING A VEHICLE BODY WITH TAB AND SLOT MEMBERS

(71) Applicants: David R. Hall, Provo, UT (US); Stephen R. Hall, Provo, UT (US)

(72) Inventors: David R. Hall, Provo, UT (US); Stephen R. Hall, Provo, UT (US)

(73) Assignee: Hall Labs LLC, Provo, UT (US)

( * ) Notice: Subject to any disclaimer, the term of this patent is extended or adjusted under 35 U.S.C. 154(b) by 454 days.

(21) Appl. No.: 15/082,450

(22) Filed: Mar. 28, 2016

(65) Prior Publication Data
US 2017/0274939 A1    Sep. 28, 2017

(51) Int. Cl.
| | |
|---|---|
| *B62D 27/02* | (2006.01) |
| *B64F 5/10* | (2017.01) |
| *B62D 25/20* | (2006.01) |
| *B62D 23/00* | (2006.01) |
| *B62D 65/02* | (2006.01) |
| *B64C 1/06* | (2006.01) |

(52) U.S. Cl.
CPC ........... *B62D 27/023* (2013.01); *B62D 23/00* (2013.01); *B62D 25/2009* (2013.01); *B62D 27/02* (2013.01); *B62D 65/028* (2013.01); *B64C 1/068* (2013.01); *B64F 5/10* (2017.01); *B62D 25/2018* (2013.01); *B62D 25/2027* (2013.01); *B62D 25/2036* (2013.01); *B62D 25/2045* (2013.01)

(58) Field of Classification Search
CPC ........ B62D 27/023; B62D 27/02; B63B 3/00; B64C 1/061
See application file for complete search history.

(56) References Cited

U.S. PATENT DOCUMENTS

| | | | |
|---|---|---|---|
| 8,398,159 B1* | 3/2013 | Hall | B62D 23/00 296/203.01 |
| 2015/0307136 A1* | 10/2015 | Dalmas | B62D 25/145 296/190.08 |

\* cited by examiner

*Primary Examiner* — Moshe Wilensky (57) ABSTRACT

A vehicle frame may comprise a plurality of interlocking tab and slot frame members forming a three-dimensional structure. A custom vehicle frame construction may be specified, designed and built based on a purchaser's selection. The three-dimensional structure may comprise a tab and slot panel to which additional tab and slot frame members are attached. The tab and slot frame members may have an attachment device disposed thereon for attachment of a vehicle component selected by the purchaser of the vehicle frame.

20 Claims, 11 Drawing Sheets

METHOD OF CONSTRUCTING A VEHICLE BODY WITH TAB AND SLOT MEMBERS

CROSS REFERENCE TO RELATED APPLICATIONS

This patent application is a continuation-in-part of U.S. patent application Ser. No. 14/662,712 filed Mar. 19, 2015, which claims priority to U.S. Provisional application No. 61/968,321 filed Mar. 20, 2014, both of which are incorporated herein by reference for all that they contain.

BACKGROUND OF THE INVENTION

The present invention relates generally to frames for vehicles such as automobiles, boats, airplanes, and the like. More specifically, the present invention relates to fasteners for vehicle frames integrally formed with such frames during an initial build of a frame.

A vehicle frame, also known as a chassis, may provide a supporting structure for a vehicle. Such frames must typically be strong enough to withstanding the static and dynamic loads experienced by the vehicle. Elements that may apply loads to a vehicle may include the weight of the vehicle body itself plus any passengers and/or cargo. As a vehicle travels, it may also be subjected to torsional loads created by traveling over uneven surfaces, lateral loads created by steering the vehicle, torque created by the engine and transmission, longitudinal loads created by acceleration and breaking, and sudden impacts from collisions. In order to withstand such loads, vehicle frames are traditionally large, heavy, expensive and difficult to manufacture.

All other vehicle components such as lights, seats, upholstery, handles, radios, and speakers may be attached to the frame. Attachment has traditionally been accomplished by fasteners welded to the frame. This welding may increase the difficulty of manufacture as well as adding to the overall weight of the vehicle.

Various attempts have been made to reduce the cost and difficulty of manufacturing these large structural bodies. For example, U.S. Pat. App. No. 2008/0169680 to Hedderly describes a vehicle body assembly having a set of castings. Each member of the set of castings interlocks with another member of the set of castings to create a vehicle body structure. Another example is disclosed in U.S. Pat. No. 8,398,159 to Hall that describes a vehicle frame comprising a plurality of frame members including at least two side plate members interlocked with a bottom plate member and a vertically loaded plate member. The side plate members support the bottom plate member and the vertically loaded plate member through a plurality of tab and slot connections.

Additionally, traditional vehicle frame designs do not allow for dynamic frame construction based on purchaser part selections In view of the foregoing, what is needed are methods of designing and constructing of vehicle frames that will enable a vehicle frame to be customized during an initial build according to specific components or parts installed in the vehicle.

BRIEF SUMMARY OF THE INVENTION

This invention has been developed in response to the present state of the art and, in particular, in response to the problems and needs in the art that have not yet been fully solved by currently available systems and methods. Accordingly, improved systems and methods have been developed to design and construct custom vehicle frames. Features and advantages of different embodiments of the invention will become more fully apparent from the following description and appended claims, or may be learned by practice of the invention as set forth hereinafter.

Consistent with the foregoing, a method of constructing a custom vehicle frame with tab and slot members is disclosed. Such a method includes: providing a plurality of unconstrained vehicle components in a three dimensional space; placing a tab and slot panel in a central proximity to the plurality of unconstrained vehicle components; measuring relative distances between distinct tabs or slots of the tab and slot panel and the plurality of unconstrained vehicle components; creating, in reference to the measured relative distances, a plurality of tab and slot frame members which connect directly or indirectly to the tab and slot panel; and constructing a vehicle frame by welding together a plurality of tabs and slots of the plurality of tab and slot frame members, wherein at least some of the tab and slot frame members are welded to the tab and slot panel.

A vehicle frame may comprise a plurality of interlocking tab and slot frame members forming a three-dimensional structure. The three-dimensional structure may comprise a main body and at least one appendage protruding from the main body. The appendage may be formed from a plurality of interlocking frame members and at least one of the plurality of interlocking frame members may only form part of the appendage. Some of the interlocking frame members forming the appendage may be parallel with each other. The plurality of interlocking frame members may comprise generally flat plates or bent plates. Such plates may be laser cut or stamped from larger plates. Such plates may also be formed of aluminum. The plates may be held together by a plurality of tab and slot connections which may further be welded in place.

The appendage may have an attachment device disposed thereon. The attachment device may comprise a hole or several holes disposed in one or several of the plurality of interlocking frame members forming the appendage. When several holes are present, they may be coaxial. The hole may comprise a threaded rivet secured therein formed of steel. The hole may also comprise a bolt secured therein.

A vehicle component such as a light, seat, handle, lock, wheel, motor, transmission, drive train, tractor implement, snow plow, weapon, tool, armor, or shock may be secured to one or more appendages.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1:
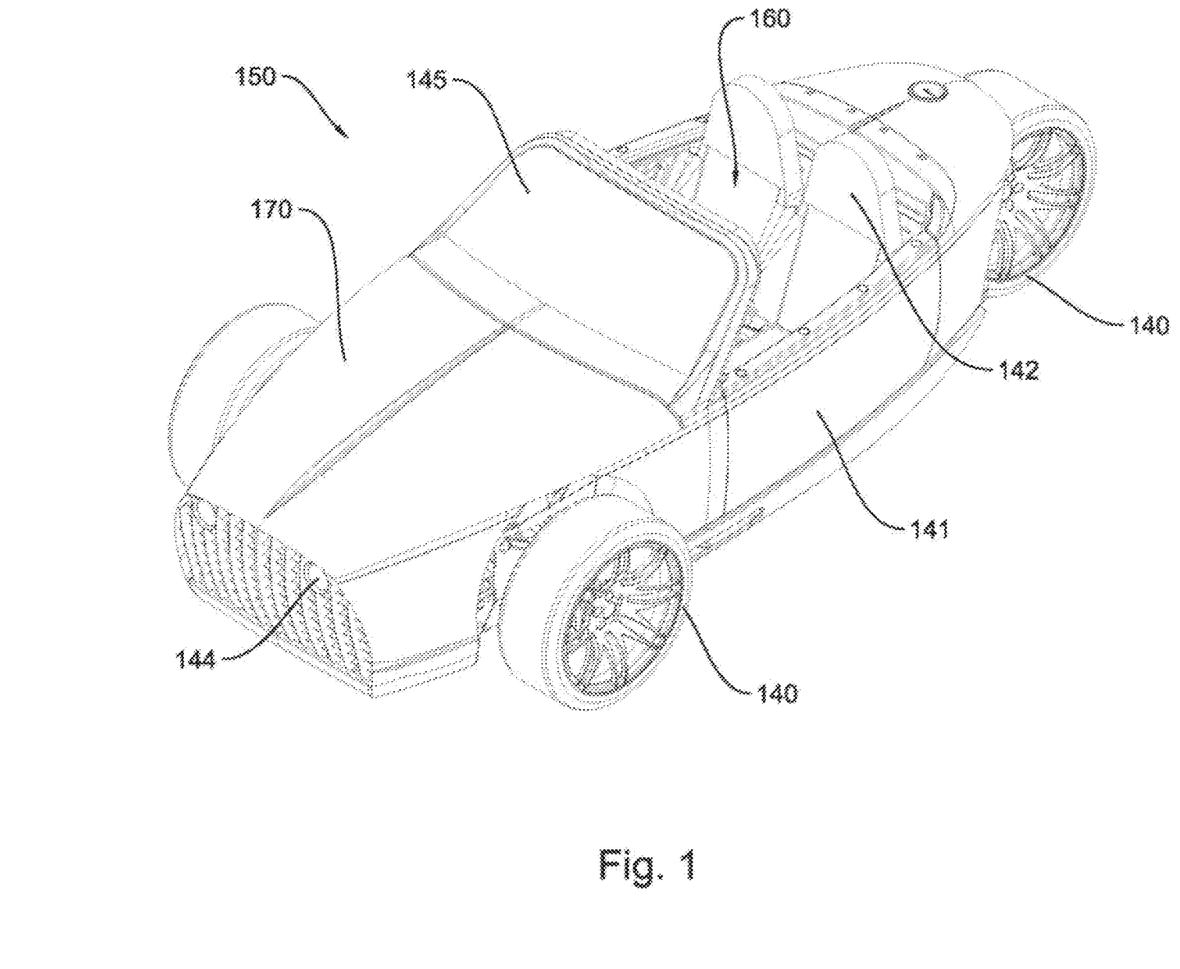
FIG. 1 is a perspective view of an embodiment of a vehicle.
Figure 2A:
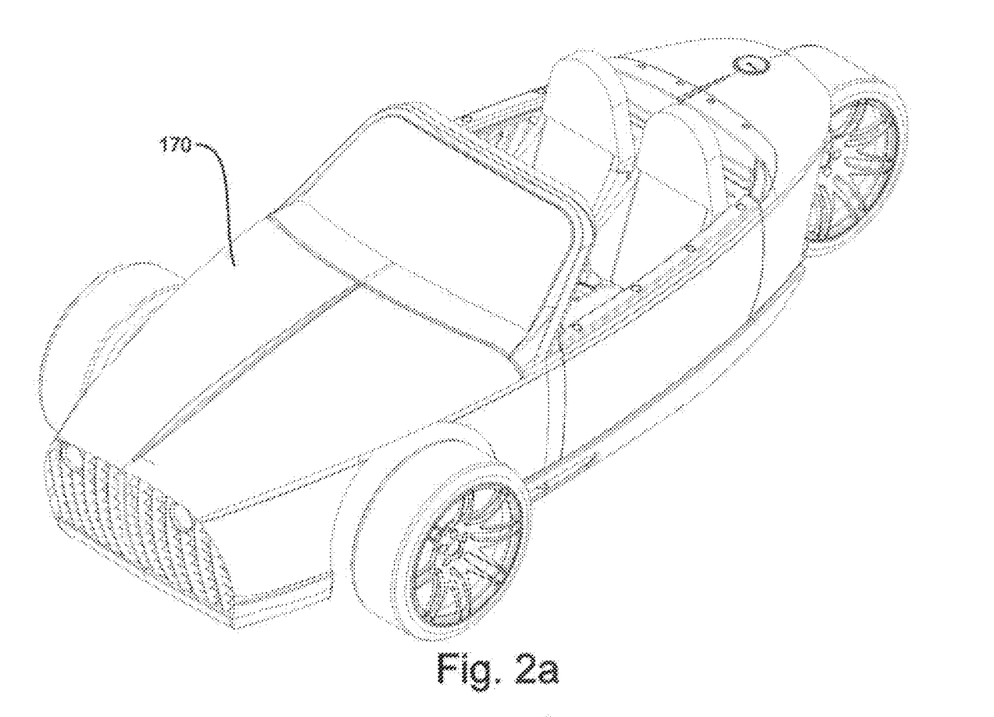
FIGS. 2a and 2b are perspective views of the vehicle body and the vehicle frame respectively of the embodiment of FIG. 1.
Figure 2B:
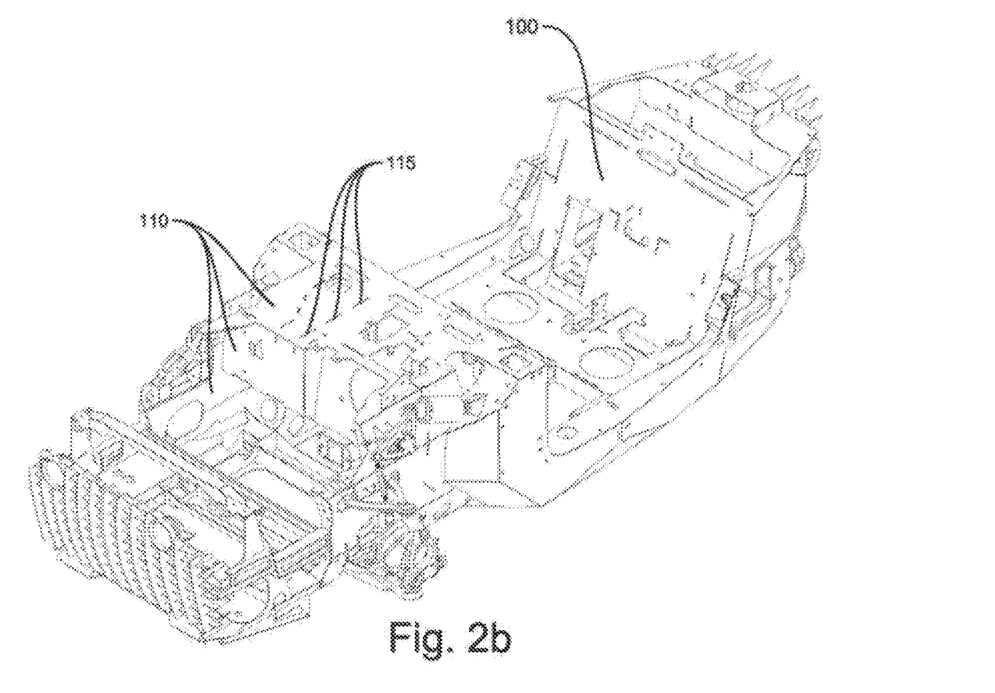

FIGS. 1, 2a and 2b show an embodiment of a vehicle 150 capable of transporting passengers and cargo over land. While the embodiment shown comprises a three-wheeled car, it should be understood that the present invention may be useful with various types of vehicles including automobiles, boats, airplanes, and the like. The vehicle 150 may comprise various components such as a plurality of wheels 140, doors 141, seats 142, lights 144, and windows 145 as well as a passenger compartment 160 and other elements that may enhance comfort, safety and ease of use of the vehicle 150. The vehicle 150 may comprise a vehicle body 170 mounted on a vehicle frame 100. In FIGS. 2a and 2b, the vehicle body 170 has been removed from the vehicle frame 100 to illustrate how the vehicle frame 100 may comprise a plurality of interlocking frame members 110 forming a three-dimensional structure. The three-dimensional structure may be designed to support the vehicle's mechanical components and body while withstanding the static and dynamic loads experienced by the vehicle. These static and dynamic loads may include the weight of the vehicle body, passengers, and cargo loads; vertical and torsional twisting created by traveling over uneven surfaces; transverse lateral forces created by road conditions, side winds, and steering of the vehicle; torque created by the engine and transmission; longitudinal tensile forces created by acceleration and compression forces created by braking of the vehicle; and sudden impacts from collisions.

As can be seen, some of the plurality of interlocking frame members 110 may comprise generally flat plates while others may comprise bent plates. Such plates may be held together by a plurality of tab and slot connections 115. Such tab and slot connections 115 may provide support to the three-dimensional structure as well as hold the three-dimensional structure together while it is being welded. By holding the three-dimensional structure together while it is being welded, the tab and slot connections 115 may obviate a jig and lead to easier and less expensive manufacture. The tab and slot connections 115, along with the rest of the plates, may be formed by laser cutting or stamping the plates out from larger plates. Additionally, the plates may be formed of aluminum to minimize the weight of the vehicle.

Figure 3:
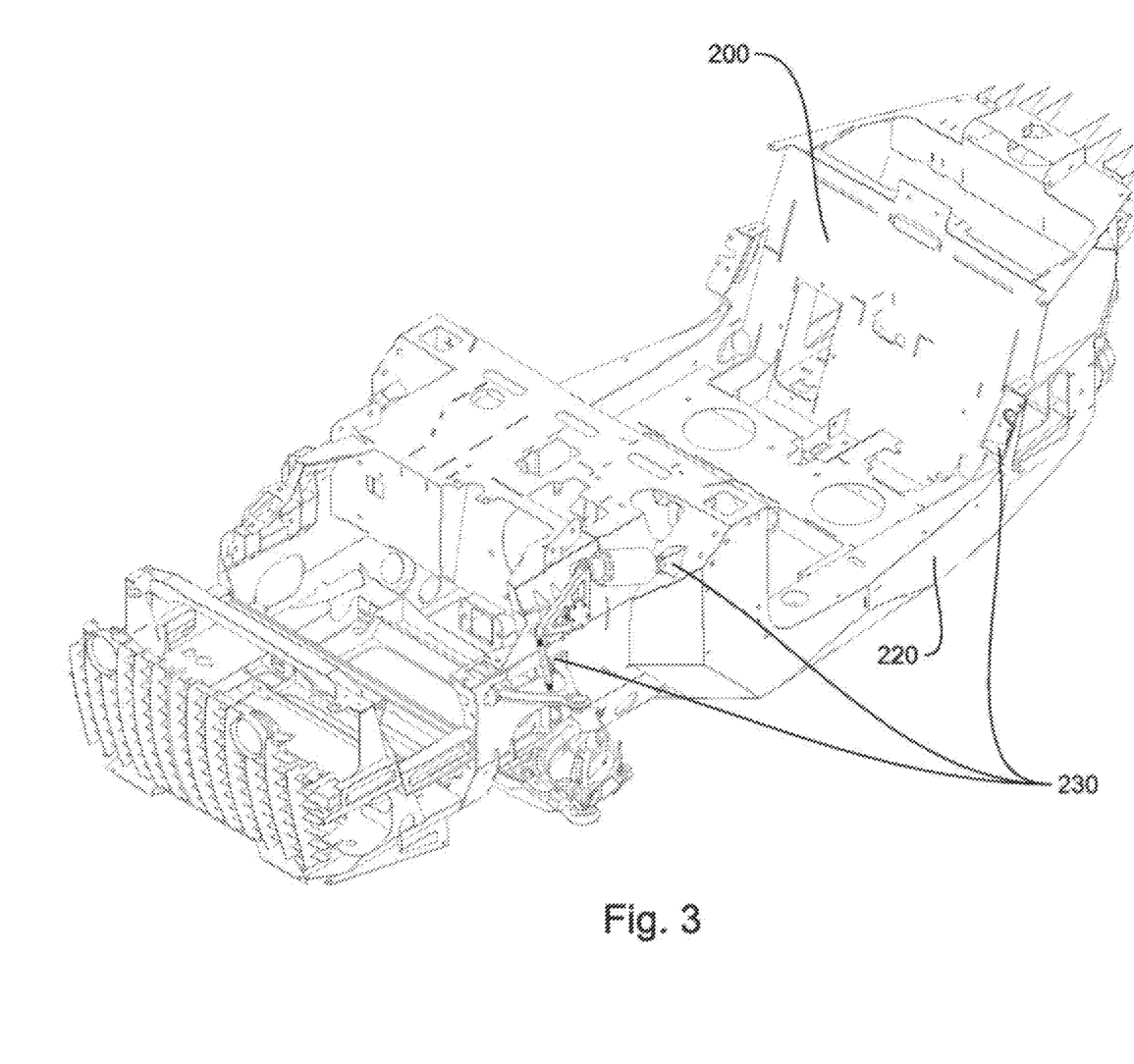
FIG. 3 is a perspective view of an embodiment of a vehicle frame comprising several appendages protruding from a main body.

FIG. 3 shows an embodiment of a vehicle frame 200. The vehicle frame 200 may comprise a three-dimensional structure comprising a main body 220 and several appendages 230 protruding from the main body 220. The appendages 230 may be formed from a plurality of interlocking frame members that also form the main body 220.

Figure 4:
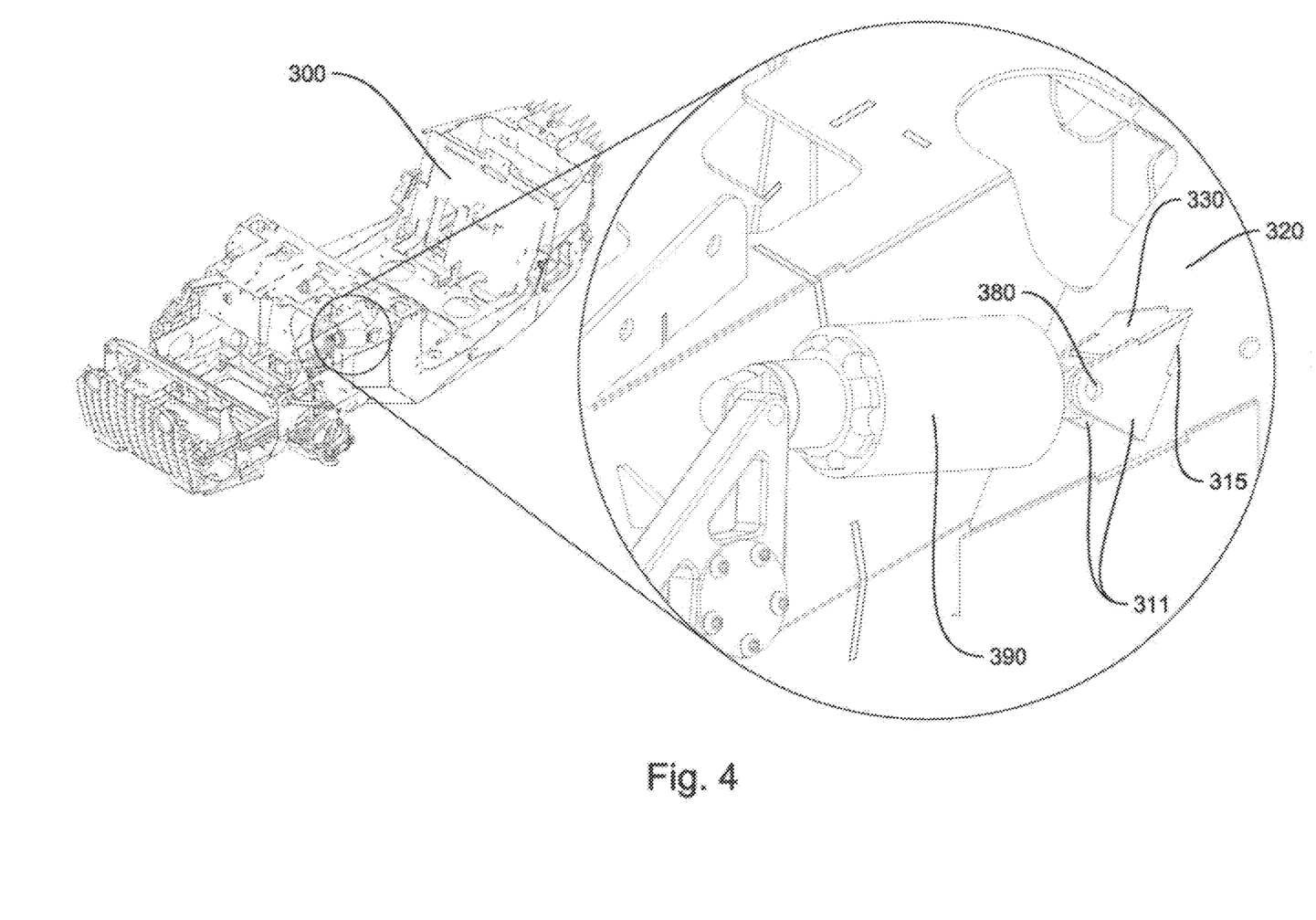
FIGS. 4 through 6 are magnified perspective views of embodiments of appendages protruding from a main body of a vehicle frame.

FIG. 4 shows one example of an embodiment of an appendage 330 protruding from a main body 320 of a vehicle frame 300. The appendage 330 may be formed of plates 311 that may be held to the main body 320 by a plurality of tab and slot connections 315. Such tab and slot connections 315 may also be welded together for increased strength. The appendage 330 may comprise an attachment device comprising two coaxial holes 380 disposed in two of the plates 311 disposed parallel to each other. A component 390, such as a shock absorber, may be secured to the appendage 330 via the attachment device such that the component 390 is obstructed from translational movement while being free to rotate around an axis of the two coaxial holes 380. It is believed that by integrating a fastener for a shock absorber into the main body 320 of a vehicle frame 300 via the appendage 330 as described allows the forces experienced by the shock absorber to be transferred into and born by the main body 320.

Figure 5:
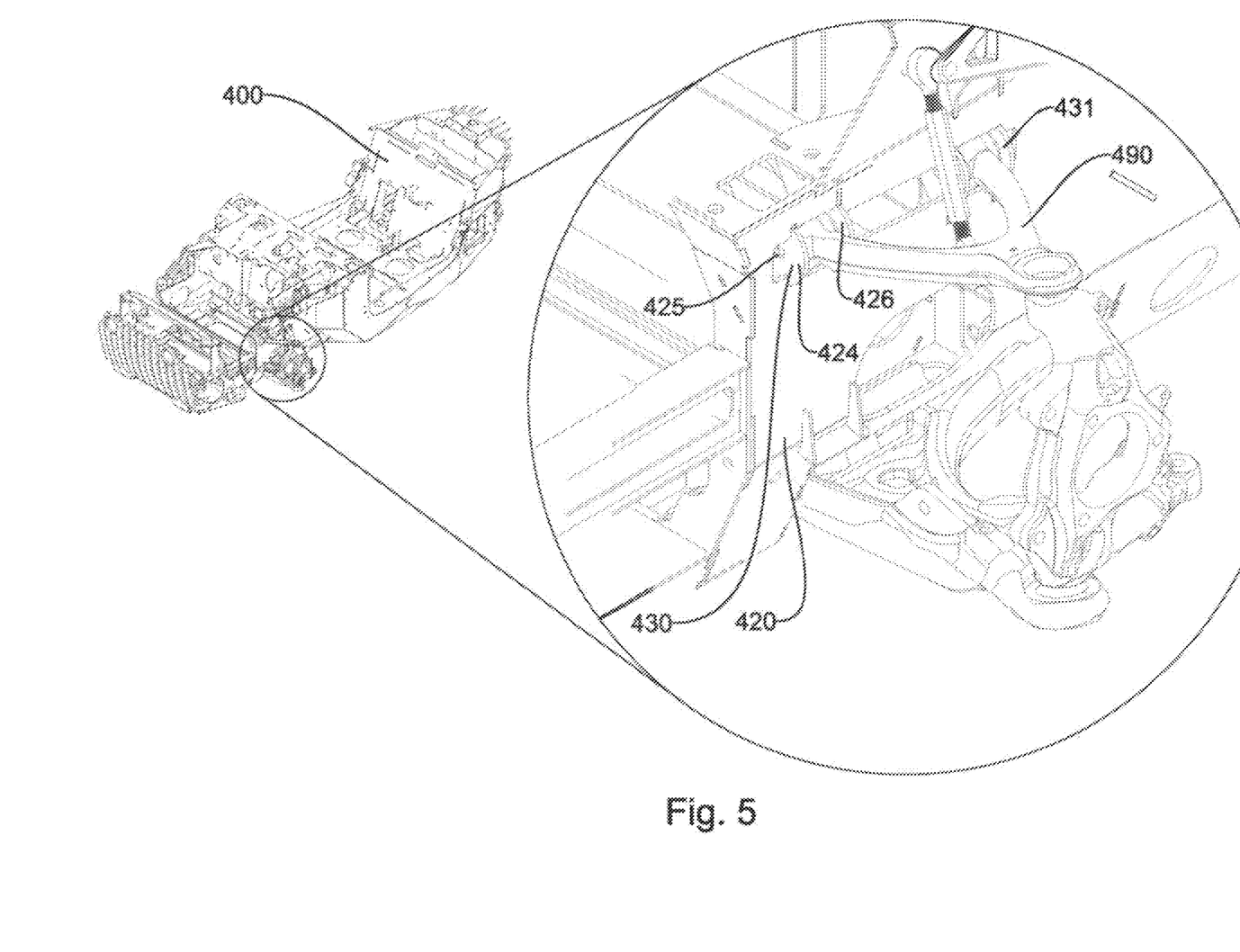

FIG. 5 shows another example of an embodiment of an appendage 430 protruding from a main body 420 of a vehicle frame 400. In this embodiment, two frame members 424, 426 may be disposed parallel to each other and may each comprise a hole 425 coaxial with the other. A component 490, such as a control arm, may be secured to the appendage 430 as well as another appendage 431 spaced from the first appendage 430 such that the component 490 is rotationally independent there from.

Figure 6:
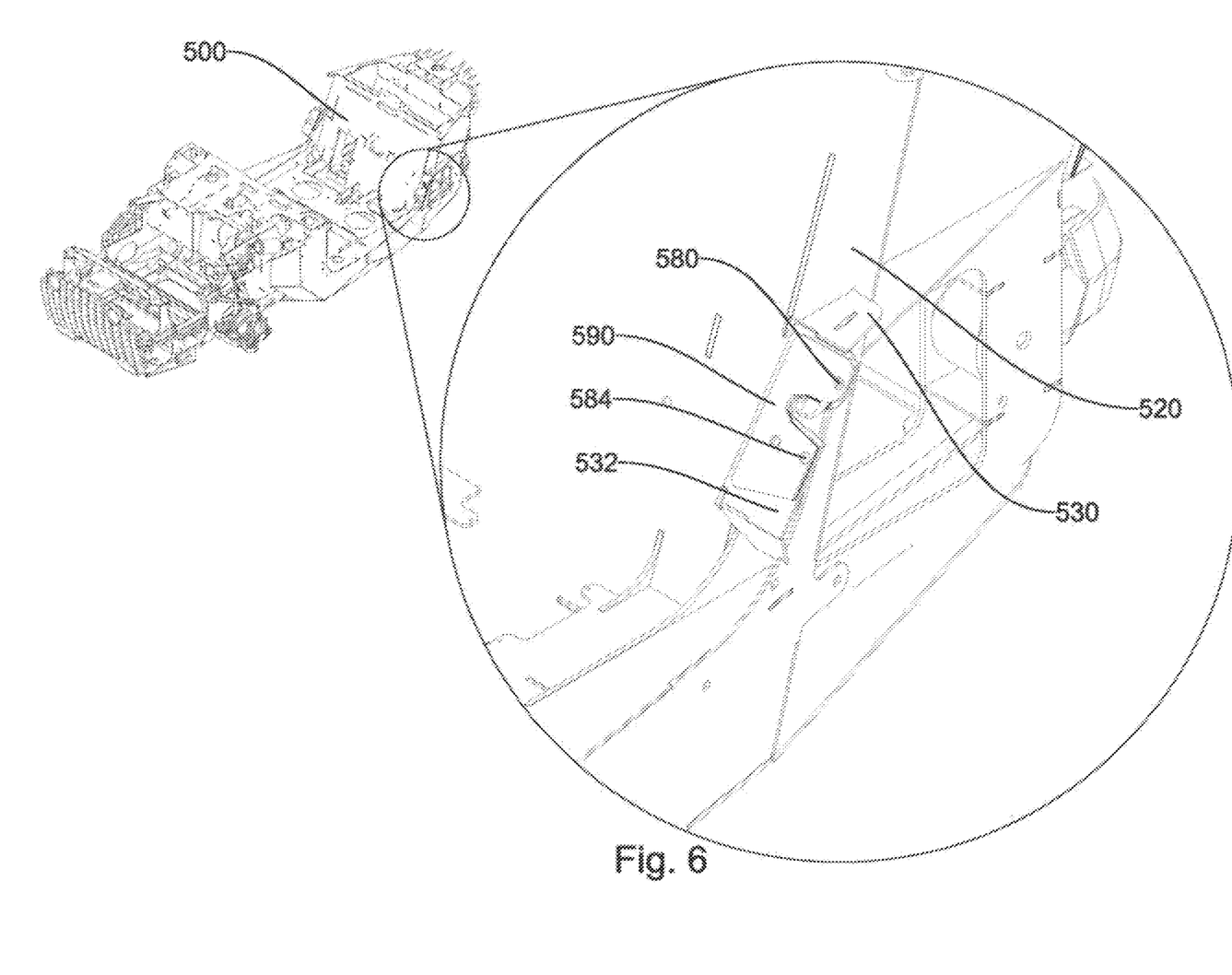

FIG. 6 shows yet another example of an embodiment of an appendage 530 protruding from a main body 520 of a vehicle frame 500. In this embodiment, one interlocking frame member 532 forms only part of the appendage 530 and not any part of the main body 520. The appendage 530 may comprise an attachment device disposed thereon comprising a hole 580 disposed in the interlocking frame member 532. A component 590, such as a door lock, may comprise matching holes 584 to the attachment device to receive bolts.

Figure 7A:
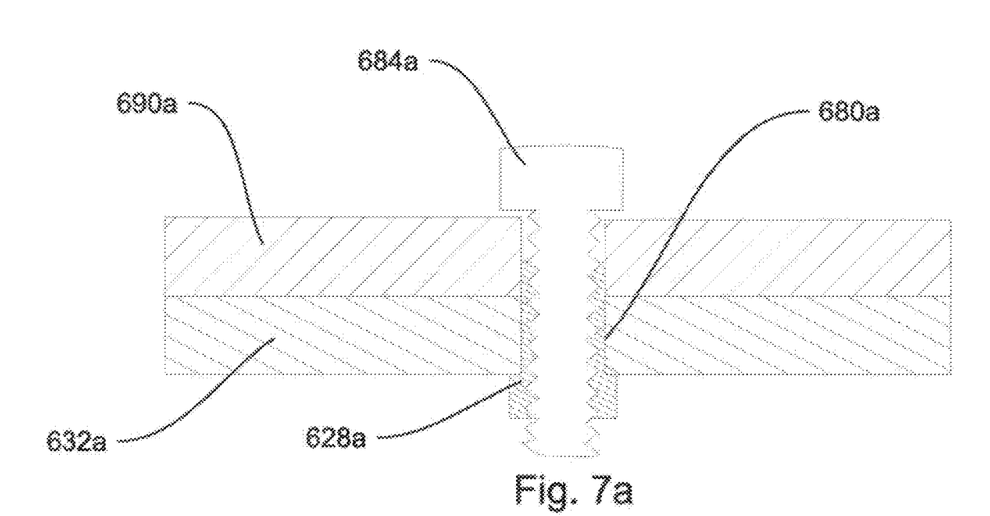
FIGS. 7a and 7b are longitudinal-section views of embodiments of attachment devices disposed on appendages.
Figure 7B:
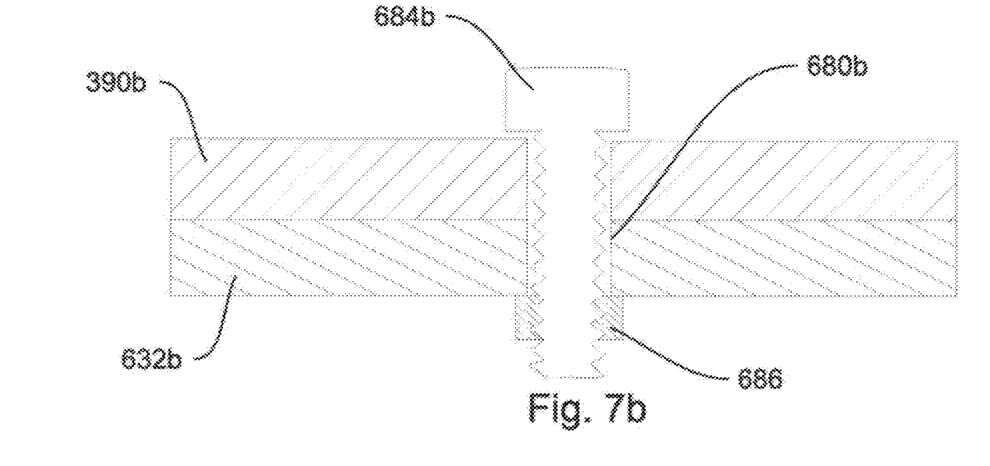

FIGS. 7a and 7b show embodiments of attachment devices disposed on appendages. For example, FIG. 7a shows a hole 680a disposed in an interlocking frame member 632a forming part of an appendage. In this embodiment, a threaded rivet 628a is secured within the hole 680a. A bolt 684a may be threaded into the threaded rivet 628a to hold a component 690a 5 to the appendage. The threaded rivet 628a may be formed of steel to keep from stripping. In another example, FIG. 7b shows a hole 680b disposed in an interlocking frame member 632b forming part of another appendage. In this embodiment a bolt 684*b* may be threaded into a nut 686 to hold a component 390*b* to the appendage. Whereas the present invention has been described in particular relation to the drawings attached hereto, it should be understood that other and further modifications apart from those shown or suggested herein, may be made within the scope and spirit of the present invention.

Figure 8A:
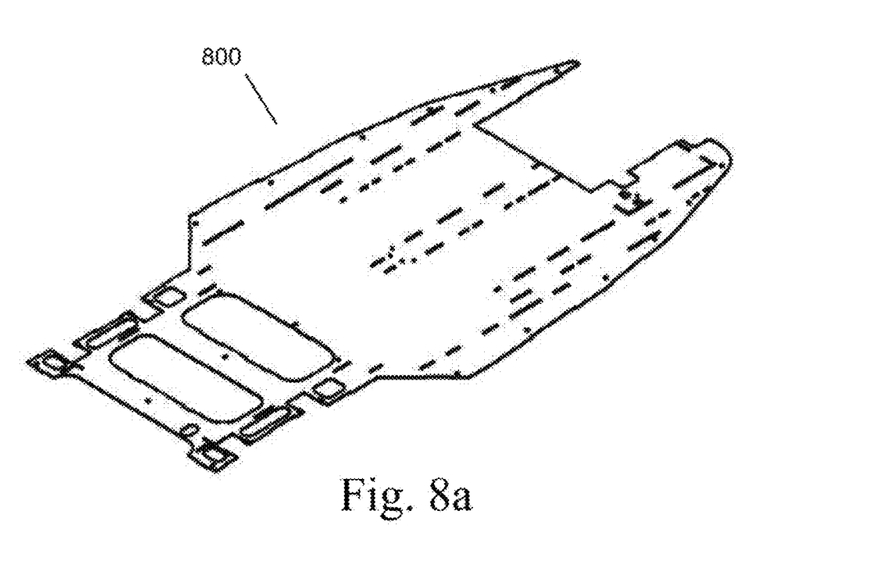
FIG. 8a is a perspective view of a tab and slot panel.

FIG. 8*a* shows a perspective view of a tab and slot panel 800. The tab and slot panel may be a flat sheet of metal. The tabs and slots may be made by laser cutting, by pressing of die punches, and/or roll forming, etc. The panel 800 may be custom made according to a vehicle purchaser's choice of vehicle components. For example, a vehicle purchaser may access a website on the Internet and select a truck with a backhoe vehicle component in the bed of the truck and a forklift vehicle component on the front of the truck. A custom tab and slot panel and tab and slot vehicle frame may then be formed to support the purchaser's selections.

Figure 8B:
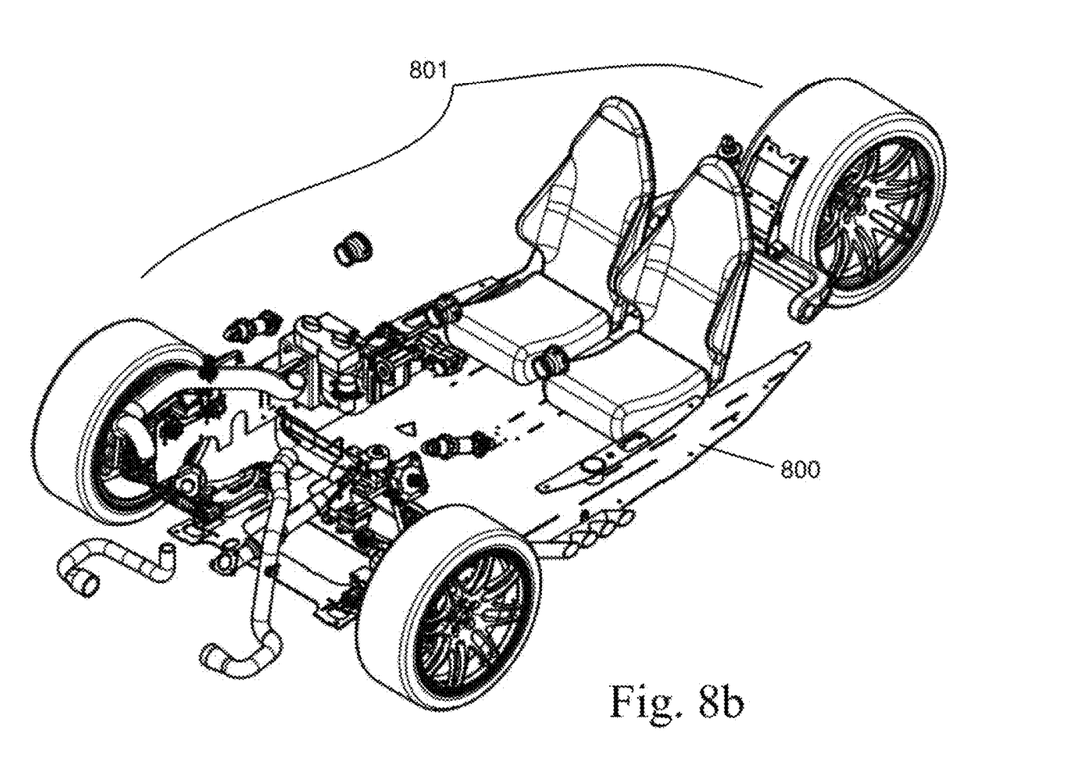
FIG. 8b is a perspective view of a tab and slot panel in a central proximity to a plurality of unconstrained vehicle components.

FIG. 8*b* shows a perspective view of a tab and slot panel in a central proximity to a plurality of unconstrained vehicle components 801. The unconstrained vehicle components 801 may be vehicle parts. The vehicle parts may be from different manufacturers or different models of vehicle or even from different types of vehicles. For example, a user may want seats of a Corvette and an engine of a Porsha. Another example might include, a Ford truck with a dump truck bed or a backhoe arm attached. The custom vehicle selection may then be modeled in a three dimensional space. The modeling may include providing a plurality of unconstrained vehicle components in a three dimensional space with a tab and slot panel in a central proximity to the unconstrained vehicle components. Relative measurements may then be taken and correlated to actual size, shape, angle and dimensions of tab and slot frame members. The tab and slot frame members may include integrally formed fasteners for attaching the unconstrained vehicle components as shown in FIGS. 4, 5, and 6. The tab and slot frame members may then be welded to one another and to the tab and slot panel to form a tab and slot vehicle frame. An example of a tab and slot vehicle frame is shown in FIG. 10*a*.

Figure 9:
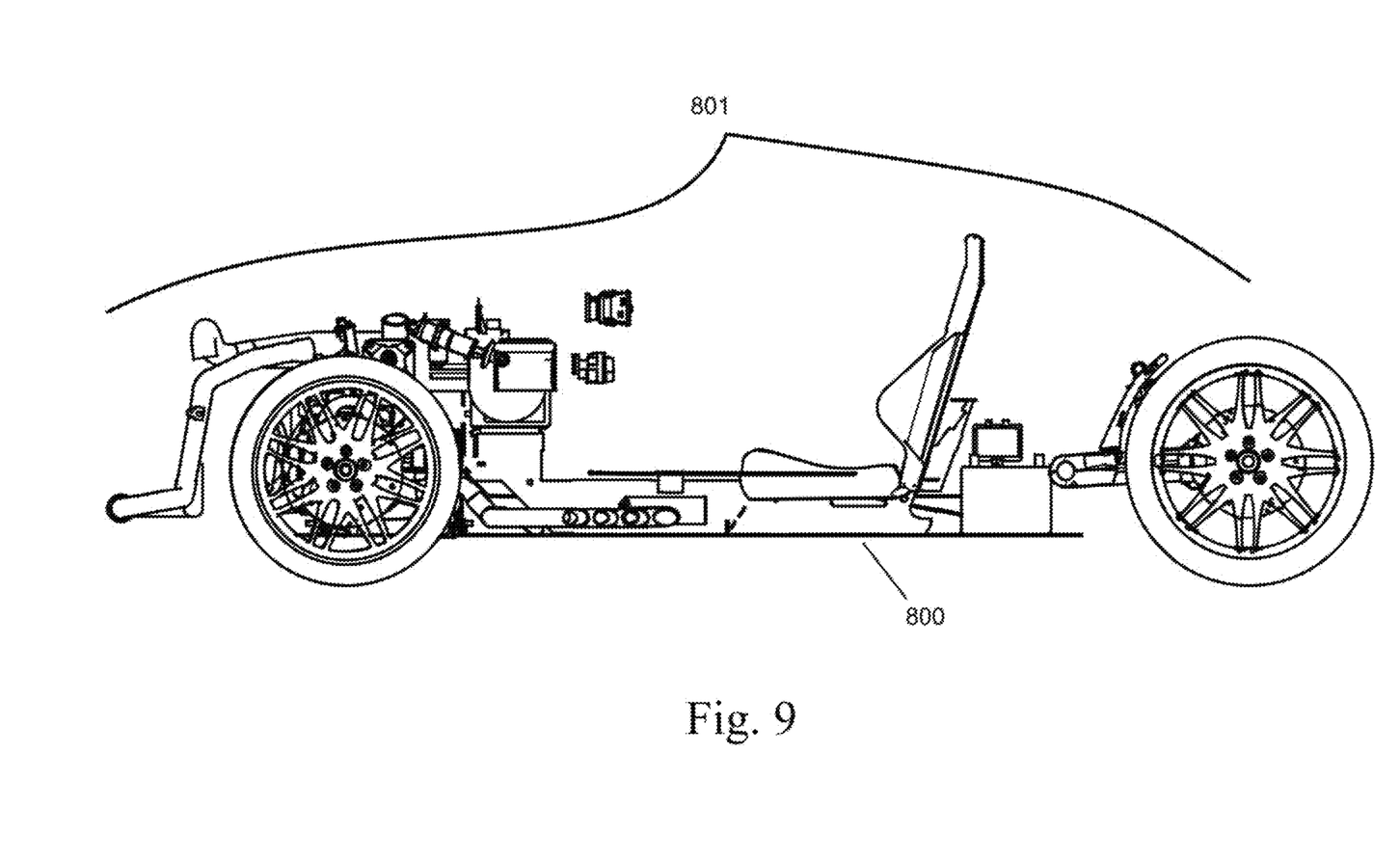
FIG. 9 is a side view of a tab and slot panel in a central proximity to a plurality of unconstrained vehicle components.

FIG. 9 shows a side view of unconstrained vehicle parts 801 floating above tab and slot panel 800. The unconstrained vehicle parts 801 and the slot panel 800 may be modeled in a three dimensional software modeling program. Relative distances between the panel 800 and parts 801 may be determined by measuring a distance between specific tabs or slots in reference to a specific part or location of a connection point of the part or to a point in space where two or more tab and slot members connect. Actual distances and length of fame members may be determined based on the measured relative distances.

Figure 10A:
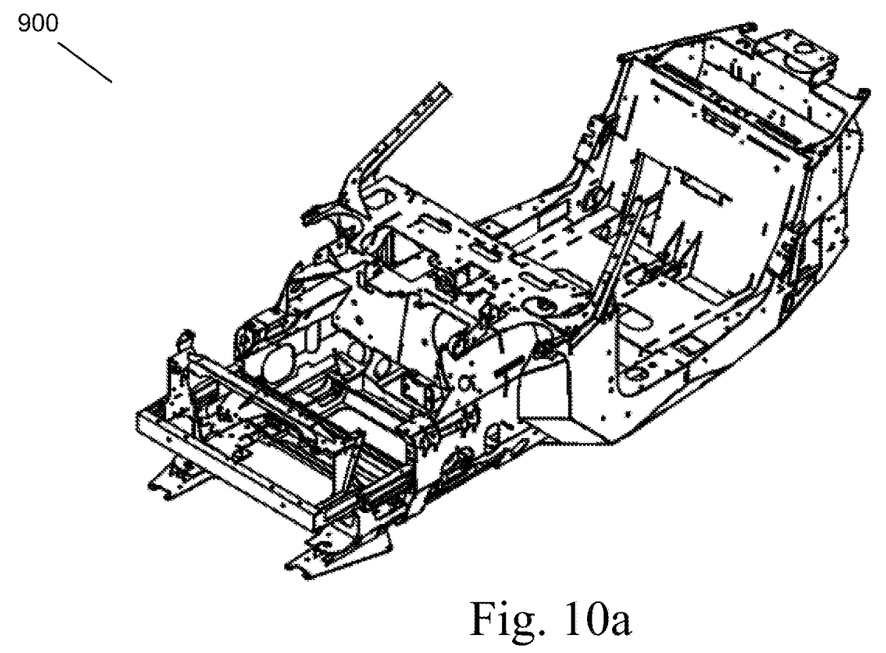
FIG. 10a is a perspective view of vehicle frame constructed from a plurality of tab and slot frame members.

FIG. 10*a* is a custom tab and slot vehicle frame constructed according to a purchaser's selection.

Figure 10B:
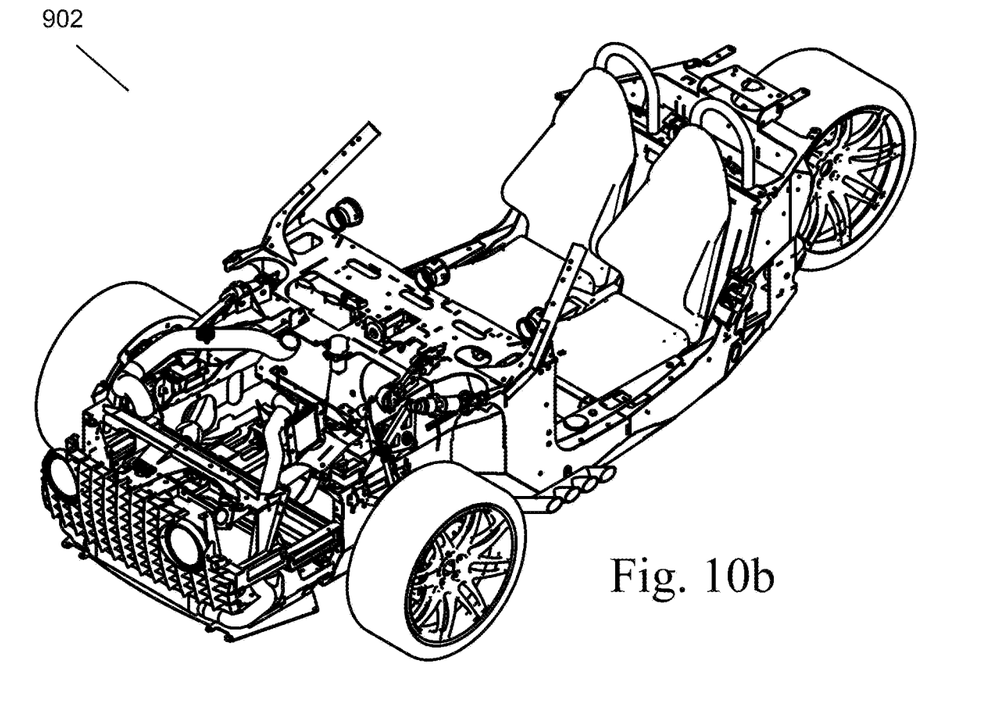
FIG. 10b is a perspective view of vehicle frame constructed from a plurality of tab and slot frame member with vehicle components connected to the vehicle frame.
Figures 11A, 11B:
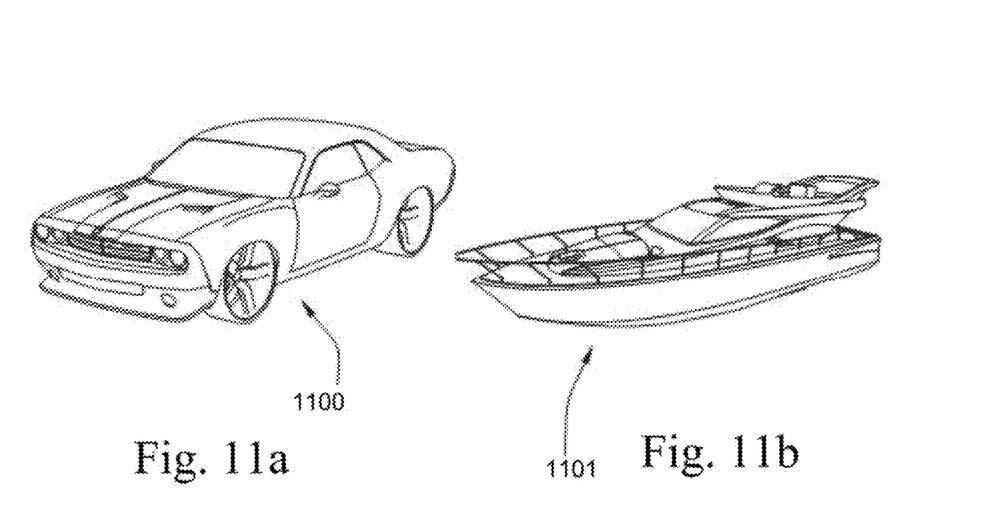
FIG. 11a is a perspective view of an embodiment of an automobile.
FIG. 11b is a perspective view of an embodiment of a water vessel.
Figure 11C:
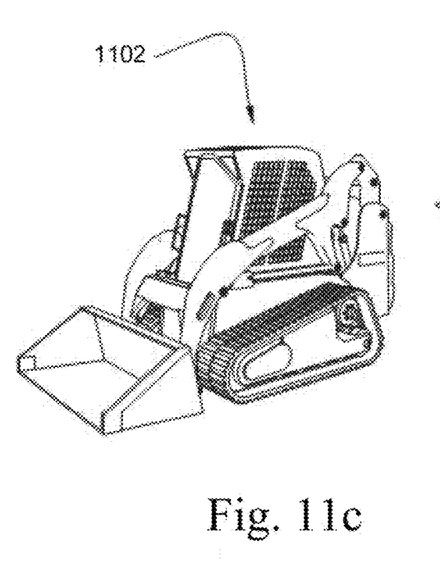
FIG. 11c is a perspective view of an embodiment of a front-loader vehicle.
Figure 11D:
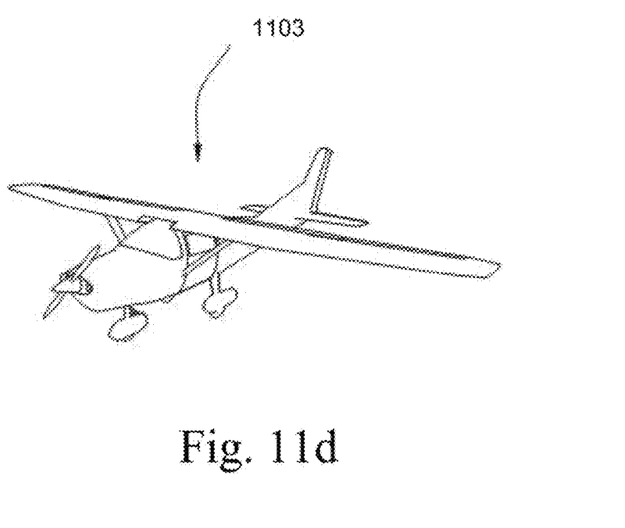
FIG. 11d is a perspective view of an embodiment of an airplane.

FIG. 10*b* is the custom tab and slot vehicle frame of FIG. 10*a* with the vehicle parts 801 now constrained to the custom vehicle. In this example, a purchaser has only chosen three wheels and so the vehicle was constructed with only three wheels. The selectable vehicle components may include lights, instrumentation, vehicle accessories, seats, vehicle features, vehicle shape, vehicle size, handles, locks, wheels, motors, transmissions, drive trains, tractor implements, snow plows, weapons, tools, armor, and/or shocks, etc.

FIGS. 11*a*-11*d* disclose embodiments of vehicles using a plurality of tab and slot frame members. The tab and slot frame members may simplify frame assembly for customized wheeled vehicles 1100; such as cars, buses, trucks, semi-trucks, motorcycles, vans, and the like. Also, the present invention may be applied to watercraft 1101, such as customized motorboats, ferries, cruise ships, kayaks, canoes, row boats, submarines, and the like. Also, the present invention may be incorporated into customized construction equipment 1102, such as tractors, back hoes, bull dozers, excavators, road planers, mining machines, steamrollers, trenchers, front loaders, and the like. Similarly, the invention may be used for customized aircraft 1103, such as passenger planes, biplanes, helicopters, spacecraft, rockets, and the like. The method disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of constructing a vehicle frame, comprising:
providing a plurality of unconstrained vehicle components in a three dimensional space;
placing a tab and slot panel, comprising a plurality of slots, wherein each slot forms a hole through the panel, in a central proximity to the plurality of unconstrained vehicle components;
measuring relative distances between distinct tab or slots of the tab and slot panel and the plurality of unconstrained vehicle components;
creating, in reference to the measured relative distances, a plurality of tab and slot frame members which connect directly or indirectly to the tab and slot panel;
and constructing the vehicle frame, by welding together a plurality of tabs and slots of the plurality of tab and slot frame members, wherein at least some of the tab and slot frame members comprise a tab that is inserted into the hole formed by a slot in the tab and slot panel, which tab is then welded to the tab and slot panel.

2. The method of claim 1, wherein the measuring relative distances includes a material thickness of the tab and slot frame member and/or the tab and slot panel.

3. The method of claim 1, wherein at least some of the plurality of tab and slot frame members include integrally formed fasteners for attaching the unconstrained vehicle components.

4. The method of claim 1, wherein the unconstrained vehicle components are manufactured vehicle components of different vehicles.

5. The method of claim 1, wherein the relative distances include one or more distances to a point in space where two or more tab and slot frame members intersect.

6. The method of claim 5, wherein the point of intersection of the two or more tab and slot frame members form an angle.

7. The method of claim 1, wherein at least some of the unconstrained vehicle components are selected by a purchaser of a vehicle created from the vehicle frame.

8. The method of claim 1, wherein at least some of the unconstrained vehicle components are selected online.

9. The method of claim 1, wherein at least some of the unconstrained vehicle components determine a finished appearance of a vehicle created from the vehicle frame.

10. The method of claim 1, wherein at least some of the unconstrained vehicle components determine a utility of a vehicle created from the vehicle frame.

11. A method of constructing a vehicle frame, comprising:
providing a plurality of unconstrained vehicle components in a three dimensional space, at least some of the unconstrained vehicle components are selected by a purchaser of the vehicle frame;
placing a tab and slot panel comprising a plurality of slots, wherein each slot forms a hole through the panel, in a central proximity to the plurality of unconstrained vehicle components;
measuring relative distances between distinct tabs and slots of the tab and slot panel and the plurality of unconstrained vehicle components;
creating, in reference to the measured relative distances, a plurality of tab and slot frame members which connect directly or indirectly to the tab and slot panel;
and constructing the vehicle frame, by welding together a plurality of tabs and slots of the plurality of tab and slot frame members, wherein at least some of the tab and slot frame members comprise a tab that is inserted into the hole formed by a slot in the tab and slot panel, which tab is then welded to the tab and slot panel.

12. The method of claim 11, wherein the measuring relative distances includes a material thickness of the tab and slot frame member and/or the tab and slot panel.

13. The method of claim 11, wherein at least some of the plurality of tab and slot frame members include integrally formed fasteners for attaching the unconstrained vehicle components.

14. The method of claim 11, wherein the unconstrained vehicle components are manufactured vehicle components of different vehicles.

15. The method of claim 11, wherein the relative distances include one or more distances to a point in space where two or more tab and slot frame members intersect.

16. The method of claim 15, wherein the point of intersection of the two or more tab and slot frame members form an angle.

17. The method of claim 11, wherein at least some of the unconstrained vehicle components are selected online.

18. The method of claim 11, wherein at least some of the unconstrained vehicle components determine a finished appearance of a vehicle created from the vehicle frame.

19. The method of claim 11, wherein at least some of the unconstrained vehicle components determine a utility of a vehicle created from the vehicle frame.

20. The method of claim 19, wherein the utility comprises one or more of:
performance, weight, use, size, and functions.

* * * * *